(12) United States Patent
Slates

(10) Patent No.: US 6,799,139 B2
(45) Date of Patent: Sep. 28, 2004

(54) SYSTEM FOR DETERMINING MACHINE RUNNING SPEED FROM MACHINE VIBRATION: APPARATUS AND METHOD

(75) Inventor: Richard D. Slates, Minden, NV (US)

(73) Assignee: Bently Nevada, LLC, Minden, NV (US)

( * ) Notice: Subject to any disclaimer, the term of this patent is extended or adjusted under 35 U.S.C. 154(b) by 44 days.

(21) Appl. No.: 10/360,144

(22) Filed: Feb. 7, 2003

(65) Prior Publication Data

US 2004/0158416 A1 Aug. 12, 2004

(51) Int. Cl.[7] .............................. G01P 11/00; G01P 5/00
(52) U.S. Cl. ...................................................... 702/142
(58) Field of Search .......................... 702/57, 127, 141, 702/142, 145, 56, 182; 73/1.37, 488, 593

(56) References Cited

U.S. PATENT DOCUMENTS

| | | | | |
|---|---|---|---|---|
| 5,115,671 A | * | 5/1992 | Hicho | 73/488 |
| 5,744,723 A | * | 4/1998 | Piety | 73/660 |
| 5,852,351 A | * | 12/1998 | Canada et al. | 318/490 |
| 6,026,348 A | * | 2/2000 | Hala | 702/56 |
| 6,087,796 A | * | 7/2000 | Canada et al. | 318/565 |
| 6,092,029 A | * | 7/2000 | Bently | 702/56 |
| 6,583,754 B2 | * | 6/2003 | Mertins et al. | 342/104 |

* cited by examiner

*Primary Examiner*—John Barlow
*Assistant Examiner*—Demetrius Pretlow
(74) *Attorney, Agent, or Firm*—Dennis A. DeBoo

(57) ABSTRACT

A System for determining machine running speed by sampling and digitizing a complex signal sensed by a transducer monitoring a machine into a digitized signal; mixing the digitized signal with a digitized signal having a predetermined frequency for obtaining a stream of inphase and quadrature components; filtering intervals of the stream of components for obtaining a plurality of vectors each having a phase; determining a unknown signal frequency of a vibration component contained in the complex vibration signal as a function of at least the one phase per second value, and calculating the machine running speed as a function of the plurality of vectors.

20 Claims, 7 Drawing Sheets

In one embodiment of the invention, a method for determining running speed of a machine from a complex vibration signal outputted by a transducer monitoring the machine includes the steps of:

1) Sampling and digitizing the complex vibration signal into a digitized vibration signal;

2) Mixing or convolving the digitized vibration signal with a digitized signal having a predetermined frequency for obtaining a series of inphase and quadrature components;

3) Transforming the inphase and quadrature components into at least one phase per second (phase/sec) or degrees per second (degrees/sec) value;

4) Determining a signal frequency of a vibration component that occurs at machine or rotative speed (1X running speed vibration component or e.g., a fraction or multiple thereof) contained in the complex vibration signal as a function of at least the one phase per second value, or degrees per second (degrees/sec) value; and 5) Calculating machine running speed or rotative speed (1X running speed vibration component or e.g., a fraction or multiple thereof) as a function of the determined signal frequency.

Figure 2

Steps 1 through 5 shown in figure 2 can be further comprised of the following:

Step (1) further including the step of: a) sampling and digitizing at a known sampling rate;

Step (2) further including the step of: a) convolving by employing a DDC for mixing the digitized vibration signal with the digitized signal having the predetermined frequency defined by a programmable down converter center frequency for obtaining the series of inphase and quadrature components;

Step (3) further including the steps of:
a) filtering the series of inphase and quadrature components at predefined time intervals each interval having the same duration in time to obtain a plurality of values or vectors having associated phases;
b) sequencing through the plurality of values, vectors or phases and taking a difference between each subsequent value, vector or phase and its immediately previous value, vector or phase starting after a first defined value, vector or phase for defining value, vector, or phase differences which define delta phase value(s);
c) determining at least the one phase per second (phase/sec) or degrees per second (degrees/sec) value as a function of delta phase value(s) by dividing at least one selected delta phase value; an average of the value, vector, or phase differences defining at least one average phase value; or a median of the value, vector, or phase differences defining at least one median phase value by the predefined time interval for determining at least the one phase per second (phase/sec) or degrees per second (degrees/sec) value;

Step (4) further including the steps of: calculating the signal frequency of the vibration component (the 1X running speed vibration component frequency ($f_{1x}$)) contained in the complex vibration signal as a function of at least the one phase per second value by determining a frequency of the resultant mixed or convolved signal (beat frequency) wherein the beat frequency is equal to (((phase/sec) or (degrees/sec))/(360 degrees/cycle)) and then determining the 1X running speed vibration component frequency ($f_{1x}$) wherein $f_{1x}$ is equal to the carrier frequency ($f_c$) plus the beat frequency ($f_B$), and Step (5) further including the step of calculating the machine running speed (1X running speed) as a function of the determined 1X running speed vibration component frequency ($f_{1x}$) wherein the machine running speed in RPM or CPM is equal to the 1X running speed vibration component frequency ($f_{1x}$) in cycles/second times 60 seconds/minute.

Figure 3

SYSTEM FOR DETERMINING MACHINE RUNNING SPEED FROM MACHINE VIBRATION: APPARATUS AND METHOD

BACKGROUND OF THE INVENTION

This invention relates generally to a system for determining running speed of a machine from vibration produced by the machine, and, in particular, to an apparatus and method for determining a frequency of a vibration component that exist within a complex vibration signal taken by a transducer monitoring a machine and using the determined frequency for determining running speed of the machine.

It is well known that industrial plants typically include a small number of critical machines (e.g., gas turbines, steam turbines, and generators) in comparison with a large number of balance of plant machines (BOP machines) such as fans, blowers, valves, compressors, et cetera. A full instrumentation suite on critical machines is desirable because any malfunction of these machines brings down the operation of the plant. In contrast, plant operation is not so dependent on BOP machines and, in addition, it is not cost effective to put a full instrumentation suite on BOP machines because there is so many of them to monitor. As a result, there is typically less instrumentation put on BOP machines.

However, in all machines (including BOP machines) one of the important parameters to know is machine speed and one example of a transducer that can determine machine speed, and also provide a very important phase reference, is manufactured and sold by the assignee of this patent application, Bently Nevada, LLC of Minden, Nev., USA, under the registered trademark Keyphasor®. In critical machines it is relatively easy to justify installing transducers necessary to know speed. However, in BOP machines, it is more difficult to justify the time consuming, laborious, and costly endeavor of installing the complete transducer suite which often means that seismic transducers such as a velocity or acceleration transducers are normally accepted for monitoring BOP machines while transducers necessary to know speed are often not installed.

This is problematic in that a large majority of BOP machines contain rolling element bearings which, regardless of type (ball, cylindrical, spherical, tapered or needle) generate specific vibration frequencies based on the bearing geometry, number of rolling elements and speed at which the bearing is rotating (i.e., machine speed). These bearing-related vibration frequencies, typically in the range of one (1) to seven (7) times the element passage rate (the rate at which the rolling elements pass a point on either the inner or outer bearing ring), are generated even by a new bearing, but the amplitudes are very small. As a bearing fails, these bearing-related vibration frequencies will increase in amplitude. It is also well known that roller spin vibration frequency and cage vibration frequency show up in a spectrum when there is a problem. Additionally, many rolling element bearing failures are the direct result of a rotor-related malfunction (e.g., unbalance, misalignment, or rotor instability) which show up in rotor-related vibrations normally occurring in the range of one-fourth (¼) to three (3) times machine speed. Furthermore, information at very high frequencies (eight times the clement passage rate to the mega hertz region) may contain early indication of a bearing problem as well as other data concerning machinery condition (e.g., rubs, gear noise, cavitation, valve noise, et cetera). Thus, the key to observing these bearing-related vibration frequencies from seismic transducers or bearing housing, casing or structural vibration measurements used to monitor rolling element bearing-related vibration problems is to know where these frequencies are which requires knowing machine speed which typically varies under on different conditions. Thus, if the machine speed is not known it is not specifically known where to look for these bearing-related vibration frequencies obtained from seismic transducers or bearing housing, casing or structural vibration measurements. Compounding this problem is the fact that seismic signals tend to be very noisy and not knowing where to look for those bearing-related vibration frequencies in a noisy seismic signal results in poor diagnosis and thus, poor predictive maintenance.

Hence, there is a need for eliminating the time consuming, laborious, and costly endeavor of installing a complete transducer suite on BOP machines for monitoring and diagnosing the condition of rolling element bearings while improving the diagnostic capability obtained from seismic transducers or bearing housing, casing or structural vibration measurements. Particularly, there is a need for solving the problem of obtaining machine speed without increasing the number of transducers required to be installed on BOP machines for improving the predictive maintenance through the use of seismic transducers or bearing housing, casing or structural vibration measurements normally accepted for monitoring machines with rolling element bearings.

BRIEF SUMMARY OF THE INVENTION

The present invention is distinguished over the known prior art in a multiplicity of ways. For one thing, one embodiment of the invention provides an apparatus and method for determining running speed of a machine from vibration measurements taken by a transducer monitoring the machine for use in, for example, correlating the machine vibrations to physical phenomena that generated them. Thus, in one aspect, the present invention eliminates the time consuming, laborious, and costly endeavor of installing a complete transducer suite on BOP machines for the monitoring and diagnostics of, for example, rolling element bearings while improving the diagnostic capability obtained from transducers or bearing housing, casing or structural vibration measurements. Hence, in one aspect the present invention solves the problem of obtaining machine speed without increasing the number of transducers required to be installed on BOP machines for improving the predictive maintenance provided by seismic transducers or bearing housing, casing or structural vibration measurements commonly accepted for monitoring machines with rolling element bearings.

In one embodiment of the invention, a method for determining running speed of a machine from a signal outputted by a transducer monitoring the machine includes the steps of sampling and digitizing the signal into a first digitized signal; digitally mixing the digitized signal with a second digitized signal having a predetermined frequency for obtaining a mixed signal comprised of a stream of inphase and quadrature components; transforming the stream of inphase and quadrature components into at least one phase value; determining a signal frequency of an unknown component contained in the first digitized signal as a function of at least the one phase per second value, and calculating machine running speed as a function of the determined signal frequency of the unknown component for use in correlating the machine measurements to physical phenomena that generated them.

In another embodiment of the invention, a method for determining running speed of a machine from a signal outputted by a transducer monitoring the machine includes the steps of sampling and digitizing the vibration signal into a first digitized signal; digitally mixing the first digitized signal with a second digitized signal having a predetermined frequency for obtaining a stream of inphase and quadrature components; transforming the stream of inphase and quadrature components into at least one rotating vector; determining the angular velocity of at least the one rotating vector, and determining machine running speed as a function of the determined angular velocity of at least the one rotating vector for use in correlating machine measurements to physical phenomena that generated them.

In another embodiment of the invention, an apparatus for determining running speed of a machine from a complex vibration signal outputted by a transducer monitoring the machine is comprised of an analog to digital converter operatively coupled to the transducer for sampling and digitizing the complex vibration signal into a digitized vibration signal; a digital multiplier operatively coupled to the analog to digital converter for digitally mixing the digitized vibration signal with a digitized signal having a predetermined frequency for obtaining a mixed signal comprised of a stream of inphase and quadrature components; a filtering means operatively coupled to the digital multiplier for filtering intervals of the stream of inphase and quadrature components for obtaining a plurality of vectors each having a phase; a processor operatively coupled to the filtering means for transforming the plurality of vectors into at least one per second (phase/sec) value; the processor determining a signal frequency of a vibration component contained in the complex vibration signal as a function of at least the one phase per second value, and the processor calculating a machine running speed as a function of the determined signal frequency for use in correlating the machine vibrations to physical phenomena that generated them.

Moreover, having thus summarized the invention, it should be apparent that numerous modifications and adaptations may be resorted to without departing from the scope and fair meaning of the present invention as set forth hereinbelow by the claims.

BRIEF DESCRIPTION OF THE DRAWINGS

FIG. 2 is a flowchart view of a method for determining machine speed from a complex machine vibration signal.

FIG. 3 is a flowchart view of showing further detail of the method shown in FIG. 2 for determining machine speed from a complex machine vibration signal.

DETAILED DESCRIPTION OF THE INVENTION

Figure 1:
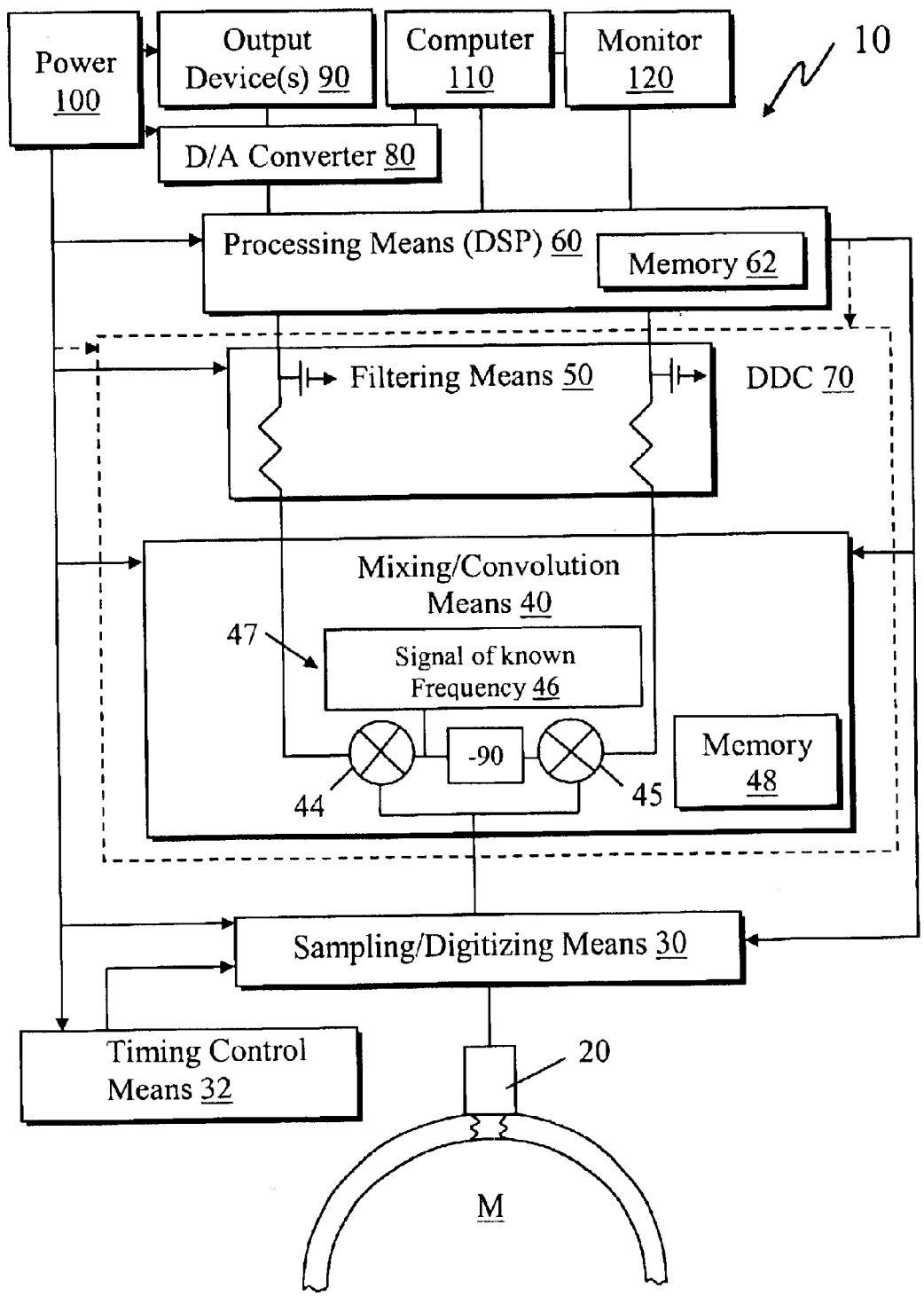
FIG. 1 is a functional block diagram/schematic view of a system for determining machine speed from a complex machine vibration signal.

Considering the drawings, wherein like reference numerals denote like parts throughout the various drawing figures, reference numeral 10 is directed to a system (apparatus and method) for determining running speed of a machine from vibration produced by the machine.

In its essence, and referring to the drawings, an embodiment of the invention provides a system 10 operatively coupled to at least one transducer 20 which, in turn, is operatively coupled to a machine M for monitoring the machine and outputting a time based complex vibration signal to the system 10 indicative of machine status. The system 10 is comprised of a sampling/digitizing means 30, a mixing or convolution means 40, a filtering means 50, and a processing means or digital signal processor (DSP) 60. The sampling means 30 is operatively coupled to the transducer 20 for receiving, sampling, and digitizing the complex vibration signal and outputting a digitized complex vibration signal to the mixing or convolution means 40. The mixing or convolution means 40 mixes or convolves the digitized complex vibration signal with a predetermined signal 46 having a know frequency for transforming the mixed signal (s) into a stream or series of inphase and quadrature readings or components. The stream of inphase and quadrature components are received and filtered by the filtering means 50 for defining a stream or series of filtered inphase and quadrature components or vectors having associated phases. The results of the filtering are received by the processing means 60 which includes means for sequencing through the stream or series of filtered inphase and quadrature components, vectors, or phases and taking a difference between each subsequent filtered component, vector, or phase and its immediately previous filtered component, vector, or phase starting after a first defined filtered component, vector, or phase for defining inphase and quadrature component differences, vector differences, or phase differences which are transformed by the processing means 60 into phase per second (phase/sec) or (degrees/sec) readings or values. The processing means 60 further includes means for determining a unknown 1X frequency vibration component (signal component that occurs at the machine or rotative speed frequency) contained in the time based complex vibration signal as a function of at least one of the inphase and quadrature component differences, vector differences, or phase differences; as a function of an average of the inphase and quadrature component differences, vector differences, or phase differences; or as a function of a median of the inphase and quadrature component differences, vector differences, or phase differences and means for calculating the running speed of the machine (1X machine running speed) as a function of the determined frequency.

Furthermore, the processing means or digital signal processor (DSP) 60 can provide the means for processing bearing-related vibration frequencies as a function of machine speeds determined in accordance with one aspect of the invention for monitoring rolling element bearing-related vibration problems from a single seismic transducer or bearing housing, casing or structural vibration measurement.

Thus, in one aspect the present invention provides an apparatus and method for determining running speed of a machine from vibrations produced by the machine for use in correlating the machine vibrations to physical phenomena that generated them.

More specifically, and referring to FIG. 1, the system 10 is operatively coupled to at least one transducer 20 such as seismic transducer which, in turn, is operatively coupled to the machine M for making, bearing housing, casing or structural vibration measurements from the machine and outputting a time based complex vibration signal to the system 10 which is correlative to these measurements. Seismic transducers are well known in the art and a wide variety of seismic transducers such as velocity transducers (and an optional velocity to displacement converter) and acceleration transducers are manufactured and sold by the assignee of the present patent application, Bently Nevada, LLC of Minden, Nev., USA. Thus, in another aspect the an provides apparatus and method for determining running speed of a machine from vibration measurements taken by a seismic transducer such as a velocity or acceleration transducer monitoring the machine for use in correlating the machine vibrations to physical phenomena that generated them.

In turn, the transducer 20 is operatively coupled to the sampling/digitizing means 30 such as an analog to digital converter which receives the time based complex vibration signal from the transducer 20. The sampling/digitizing means 30 is operatively coupled to mixing or convolution means 40 and samples and digitizes the complex vibration signal and outputs a digitized complex vibration signal to the mixing or convolution means 40. A timing control means 32 or the processor means 60 can be operatively coupled to the sampling means 30 for providing a control signal to the sampling means 30 for sampling the time based complex vibration signal at, for example, a known sampling rate.

The mixing or convolution means 40 receives the digitized complex vibration signal and mixes or convolves it with a predetermined signal 46 having a know frequency provided for obtaining a mixed signal comprised of a series of inphase and quadrature readings or components.

More specifically, the mixing/convolution means 40 is comprised of digital multipliers 44, 45 (represented by circles with an "X" in the middle) and a complex or numerically controlled oscillator 47 inputting the signal 46 of known frequency to multiplier 44 and the signal 46 of known frequency delayed by ninety degrees to multiplier 45. The digitized complex vibration signal (comprised of an unknown vibration component having an unknown frequency which is being sought after) is also inputted into each of the digital multipliers 44 and 45. The digital multiplier 44 multiplies or mixes the signal with a digital sine signal having a known frequency and the digital multiplier 45 multiplies or mixes the digitized complex vibration signal with a digital cosine signal (the sine wave delayed by ninety degrees) having the same known frequency for obtaining the series of inphase and quadrature readings or components. The digital sine and cosine signal may have any known frequency and can be pulled from a memory 48 of the mixing/convolution means 40, from a memory 62 of the processing means 60 or from other memory.

The filtering means 50 is operatively coupled to the mixing/convolution means 40 and receives and filters or averages the series of inphase and quadrature readings or components into filtered inphase and quadrature components or vectors having associated phases.

The filtering means 50 and the mixing/convolution means 40 (including the digital multipliers 44, 45 and the complex or numerically controlled oscillator 47) can be implemented with a digital down counter (DDC) 70. The DDC has the capability of being programmed for what frequency to process. In other words, the DDC has the capability of being programmed with a down convert frequency for providing the signal of known frequency 46 for driving the digitized complex vibration signal down based on an expected range or bandwidth that the signal (e.g., the 1X frequency vibration component or signal) that is being looked for should exist in. Of course, the digital down counter (DDC) 70 may also be used to implement only the mixing/convolution means 40. One example of a commercially available digital down counter is manufactured by INTERSIL™ Corporation (Harris Semiconductor) and sold under part number HISP 50016 and another example of a commercially available digital down counter is manufactured by Texas Instruments and sold under part number GC 4016.

It should be noted that another possible way to implement the mixing/convolution means 40 and the filtering means 50 as contemplated by an embodiment of the present invention is to interpose a Field Programmable Gate Array (FPGA) between the analog to digital converter 30 and the DSP means 60. The difference between this configuration and that described hereinabove for the mixing/convolution means and filtering means is that the structure of the hardware necessary to perform the convolution method is built and programmed into the Field Programmable Gate Array (FPGA).

Thus, either the filtering means 50, DDC 70, or FPGA is operatively coupled to the processing means 60. The outputs from filtering means 50, DDC 70, or FPGA are received by the processing means (DSP) 60 which provides the means for sequencing through the series of inphase and quadrature components, the series of vectors, or the series of phases and taking a difference between each subsequent component, vector, or phase and its immediately previous component, vector, or phase starting after a first defined component, vector, or phase for defining inphase and quadrature component differences, vector differences, or phase differences (delta phases). The DSP 60 further includes means for transforming at least one of, an average of, or a median of the inphase and quadrature component differences, vector differences, or phase differences into at least one phase per second (phase/sec) or degrees per second (degrees/sec) reading or value. The processing means 60 further includes means for determining a 1X frequency vibration component contained in the time based complex vibration signal as a function of at least the one determined phase per second (phase/sec) or degrees per second (degrees/sec) reading or value, and means for calculating machine running speed (1X running speed) as a function of the determined 1X frequency.

The mixing/convolution means 40 and the filtering means 50 can be integrally formed with the processing means 60 wherein the processing means 60 is operatively coupled to the sampling means or analog to digital converter 30 for receiving the digitized complex vibration signal and convolving and filtering the digitized complex vibration signal into filtered inphase (real) and quadrature (imaginary) components, vectors, or phases. Examples of processing means 60 having integral convolution means 100 can be found in the 210XX series of DSP devices manufactured by Analog Devices.

Moreover, the processing means 60 can be operatively coupled to a computer 110 or to a digital to analog converter 80 which in turn, can be operatively coupled to physical output devices 90 such as alarms, relay outputs, or current outputs wherein the processing means 60 can process bearing-related vibration frequencies as a function of machine speeds determined in accordance with one aspect of the invention for monitoring rolling element bearing-related vibration problems and then convey information to output devices 90 and/or to computer 110 for, inter alia, generating alarms based on determined bearing-related vibration problems and using these alarms to automatically shut down the machine M and/or for automatically annunciating machinery problems to operators and other plant personnel.

Additionally, the DSP means 60 can continuously accumulate, process and store the transformed values obtained by mixing the digitized complex vibration signal with the complex signal having its frequency set by a user and then averaging or filtering the results into a series of inphase (real) and quadrature (imaginary) components, vectors, or phases for determining a variety of frequency vibration component contained in the time based complex vibration signal.

As is required, a power supply means 100 can be operatively coupled to transducer 20, sampling/digitizing means 30, timing control means 32, mixing/convolution means 40, filtering means 50, DDC 70, processing means 60, digital to analog converter 80, output devices 90, and computer 110 for providing power as needed.

Referring to FIG. 2 in combination with FIG. 1, and in light of the above description, one method embodiment of the invention for determining running speed of a machine from a complex vibration signal outputted by a transducer monitoring the machine includes the steps of: 1) sampling and digitizing the complex vibration signal into a digitized vibration signal; 2) mixing or convolving the digitized vibration signal with a digitized signal having a predetermined frequency for obtaining a series of inphase and quadrature components; 3) transforming the inphase and quadrature components into at least one phase per second (phase/sec) or degrees per second (degrees/sec) value; 4) determining a signal frequency of a vibration component that occurs at machine or rotative speed (1X running speed vibration component or a fraction or multiple thereof) contained in the complex vibration signal as a function of at least the one phase per second or degrees per second (degrees/sec) value and 5) calculating machine running speed (1X running speed or a fraction or multiple thereof) as a function of the determined signal frequency.

Referring now to FIG. 3 in combination with FIGS. 1 and 2, steps 1 through 5 in the above method can be further comprised of the following: Step 1) further including the step of: sampling and digitizing the complex vibration signal into the digitized vibration signal at a known sampling rate; Step 2) further including the step of: employing a DDC for mixing the digitized vibration signal with the digitized signal having the predetermined frequency defined by a programmable down converter center frequency for obtaining the series of inphase and quadrature components; Step 3) further including the steps of: a) filtering the series of inphase and quadrature components at predefined time intervals each interval having the same duration in time to obtain a plurality of values or vectors having associated phases; b) sequencing through the plurality of values, vectors or phases and taking a difference between each subsequent value, vector or phase and its immediately previous value, vector or phase starting after a first defined value, vector or phase for defining value, vector, or phase differences which define delta phase value(s); and c) determining at least the one phase per second (phase/sec) or degrees per second (degrees/sec) value as a function of delta phase value(s) by dividing at least one selected delta phase value; an average of the value, vector, or phase differences defining at least one average phase value; or a median of the value, vector, or phase differences defining at least one median phase value by the predefined time interval for determining at least the one phase per second (phase/sec) or degrees per second (degrees/sec) value; Step 4) further including the step of: calculating the signal frequency of the vibration component (the 1X running speed vibration component frequency ($f_{1X}$)) contained in the complex vibration signal as a function of at least the one phase per second value by determining a frequency of the resultant mixed or convolved signal (beat frequency) wherein the beat frequency is equal to (((phase/sec) or (degrees/sec))/(360 degrees/cycle)) and then determining the 1X running speed vibration component frequency ($f_{1X}$) wherein $f_{1X}$ is equal to the carrier frequency ($f_{cs}$) plus the beat frequency ($f_B$), and Step 5) further including the steps of: calculating the machine running speed (1X running speed) as a function of the determined 1X running speed vibration component frequency ($f_{1X}$) wherein the machine running speed in RPM (rotations per minute) or CPM (cycles per minute) is equal to the 1X running speed vibration component frequency ($f_{1X}$) in cycles/second times 60 seconds per minute.

Thus, in one aspect the present invention provides an apparatus and method for 1) sampling a time based vibration signal produced from a machine for defining at least one sampled signal; 2) mixing or convolving the at least one sampled signal with a signal having a know frequency; 3) filtering the result to obtain a plurality of values or vectors having associated phases; 4) sequencing through the plurality of values, vectors or phases and taking a difference between each subsequent value, vector or phase and its immediately previous value, vector or phase starting after a first defined value, vector or phase for defining value, vector, or phase differences; 5) determining a frequency of a vibration component contained in the time based vibration signal as a function of at least one of the value, vector, or phase differences, as a function of an average of the value, vector, or phase differences, or as a function of a median of the value, vector, or phase differences, and 6) calculating a running speed of the machine as a function of the determined frequency.

In another aspect the present invention provides an apparatus and method for 1) sampling a time based vibration signal produced from a machine for defining a plurality of sampled signal sets wherein the plurality sampled signal sets do not have to be sampled contiguously; 2) mixing or convolving each one of said plurality of sampled signal sets with a signal having a know frequency; 3) filtering the results of each sampled signal set mixed with said signal having the known frequency to obtain a plurality of filtered sets of values, vectors, or phases; 4) sequencing through each one of said plurality of filtered sets of values, vectors, or phases and taking a difference between each subsequent value, vector or phase in each of said plurality of filtered sets and its immediately previous value, vector, or phase starting after a first defined value, vector, or phase for defining value, vector, or phase differences for each one of said plurality of filtered sets; 5) finding an average or a median of the value, vector, or phase differences for each one of said plurality of filtered sets for defining a plurality of average sets or a plurality of median sets; 6) determining a frequency of a vibration component contained in the time based vibration signal as a function of an average of said plurality of average sets or as a function of a median of said median sets; and 7) calculating a running speed of the machine as a function of the determined frequency.

In an additional aspect, one embodiment of the invention can provide means for processing bearing-related vibration frequencies as a function of the determined machine speeds for monitoring, for example, rolling element bearing-related vibration problems from a single transducer or, for example, a bearing housing, casing or structural vibration measurement.

These aspects, among other things, demonstrate industrial applicability of this invention.

An example will now be delineated for further explaining the system 10 (apparatus and method).

First, consider needing to accurately determine a frequency of a signal which is centered on a given frequency but will vary several kilohertz on both sides of a carrier. Next, assume that there is a frequency modulation that will range from the center frequency to ±10 KHz around the carrier. It is important that a maximum frequency range is specified. Additionally, there is an assumption here that there is not enough other noise within the passband of the frequency modulation detector relative to the frequency that is being sought after to throw the system out of "lock".

Figure 4:
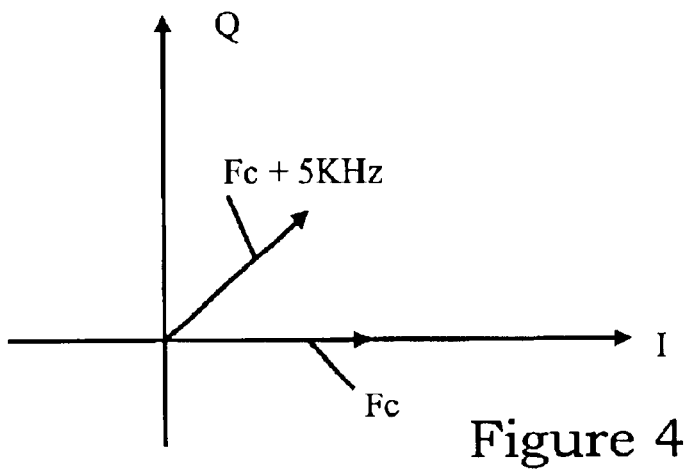
FIG. 4 is a graphical representation of an inphase and quadrature plot or polar plot of vectors obtained from a down converter or carrier signal (Fc) and an input signal (e.g., Fc plus five kilohertz).

Now, assume a 10 MHz carrier (Fc) with a signal that goes ±10 KHz around that center frequency. Additionally, assume that at one instance in time the signal is at 10.005 MHz (Fc ±5 KHz). FIG. 4 shows both signals on a polar plot as a 10.000 MHz down converter frequency (Fc) and as a 10.005 MHz signal (Fc ±5 KHz).

Then, in accordance with one aspect of the invention 10.005 MHz signal is sampled and digitized and then digitally multiplied by an Inphase/Quadrature down converter center frequency which, in this case, is the 10 MHz carrier signal (Fc).

Figure 5:
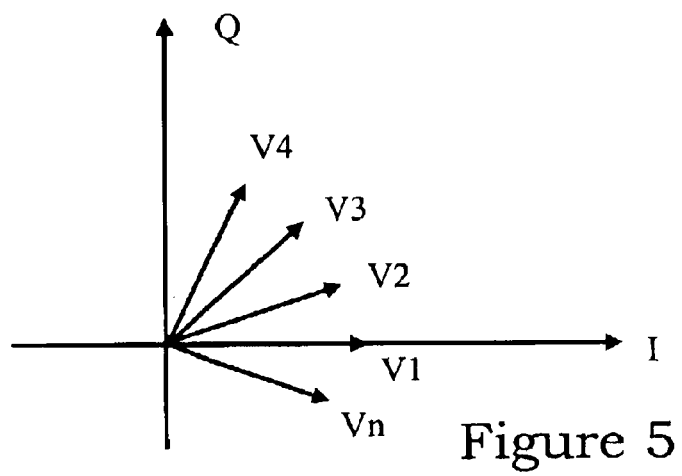
FIG. 5 is a graphical representation of an inphase and quadrature plot or polar plot of vectors obtained from filtering or averaging results obtained from mixing a down converter signal (signal of known frequency) with an input signal (e.g., a sampled complex machine vibration signal).

FIG. 5 shows the results of the signals in FIG. 4 being mixed together and filtered. Particularly, when the multiply is preformed, a stream of outputs or readings representing the instantaneous Inphase and Quadrature of the mixed signal is obtained. These readings need to be averaged or filtered together to obtain a DC component which represents the actual complex representation of a vector (because there is a strong 2X component sitting on the output as well as noise from other frequency components at the input).

The length of time of the average is an important factor for determining the frequency selectivity of the method pursuant to one embodiment of the invention and will be explained in more detail hereinbelow.

Now, the averaging or filtering of the readings is performed for a period of time to obtain a first output $V_I$ shown in FIG. 5. Then the averaging or filtering a next set of readings is performed for the same period of time to obtain a second output $V_2$ shown in FIG. 5 and so on through an Nth output $V_n$. The output signal is a rotating vector because the actual input signal frequency does not exactly match the down converter signal frequency. It turns out that the rotation speed of the output vector (degrees per averaging period) is directly proportional to the difference in frequencies. In this case, if neither frequency drifted over the measurement period a fixed rotation in terms of degrees per averaging period would be obtained.

Now, assume the sample rate is 50 MHz, and the inphase and quadrature multiplication is preformed on every sample and an averaging interval of 10 uS is defined between each reading. This provides 10 averaged phasor outputs for the worst case modulation (10 KHz). Also, 10 microseconds is exactly 500 samples. Thus, if the signal is 10.005 MHz, it will take exactly 200 microseconds for the signal to rotate one complete rotation relative to the carrier. This means that the 5 KHz rotation is 360° per 200 microseconds. Since the update rate is 10 microseconds, there would be a counter rotating vector spinning at a rate of 18° per 10 microseconds (or 18° per update). Now, in accordance with one embodiment of the invention, if a frequency of the above signal is unknown, a rotating vector spinning at the 18 degrees per 10 microseconds can be determined, divided by 360 degrees to obtain a beat frequency of 5 KHz, and then added to the down convert frequency for obtaining the 10.005 MHz wherein the unknown frequency of the signal is determined.

Figure 6:
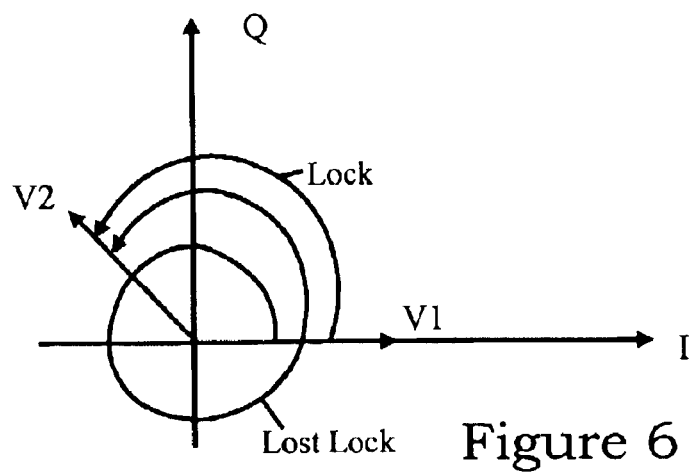
FIG. 6 is a graphical representation of an inphase and quadrature plot or polar plot of vectors obtained when a Lost lock situation is obtained.

Referring to FIG. 6, the averaging time is important because if the average is for too long of a time, the signal may rotate too far to know what is going on as shown in FIG. 6 wherein a lock is obtained on one averaging time between signals $V_1$ and $V_2$ and a lost lock situation is obtained on another averaging time between signals $V_1$ and $V_2$ which is for too long of a time. Hence, it is important to set the averaging time of the Inphase and Quadrature outputs to be short enough so that they do not rotate more than 180° at the highest possible frequency modulation. Note that when the signal rotates counter clockwise it indicates that the signal is greater in frequency than the down converter signal. Rotation in the clockwise direction means the signal is less than the down converter frequency. Additionally, the averaging time should not be made too short or only a small amount of the available phase range will be used (i.e., 0 to 90° is probably better than 0 to 0.001° for an output range). A longer averaging time has the advantage of filtering out more of the unwanted noise; however, this can be done later in the signal processing chain.

Furthermore, a stream or series of phasor readings is obtained from the inphase and quadrature multiplication and the stream can be filtered to get even more filtering of unwanted noise and improve resolution. For example, and referring to FIG. 5, after obtaining a first set of averaged inphase and quadrature readings defining a first phasor $V_1$, a second set of inphase and quadrature readings is obtained defining a second phasor $V_2$ for allowing the first phasor to be subtracted from the second phasor to get a delta phase (18° in the example above). You then subtract the second averaged reading phasor from the third averaged reading and so on. All of these reading or phasor differences should be 18° in a noise free environment. However, if there is noise, the reading differences or phasor differences can be averaged or a median value can be found. It should be noted that the longer one averages these phase differences together the slower any change in the signal will take to propagate to the output. Thus, one is trading off system bandwidth for noise reduction.

Figure 7:
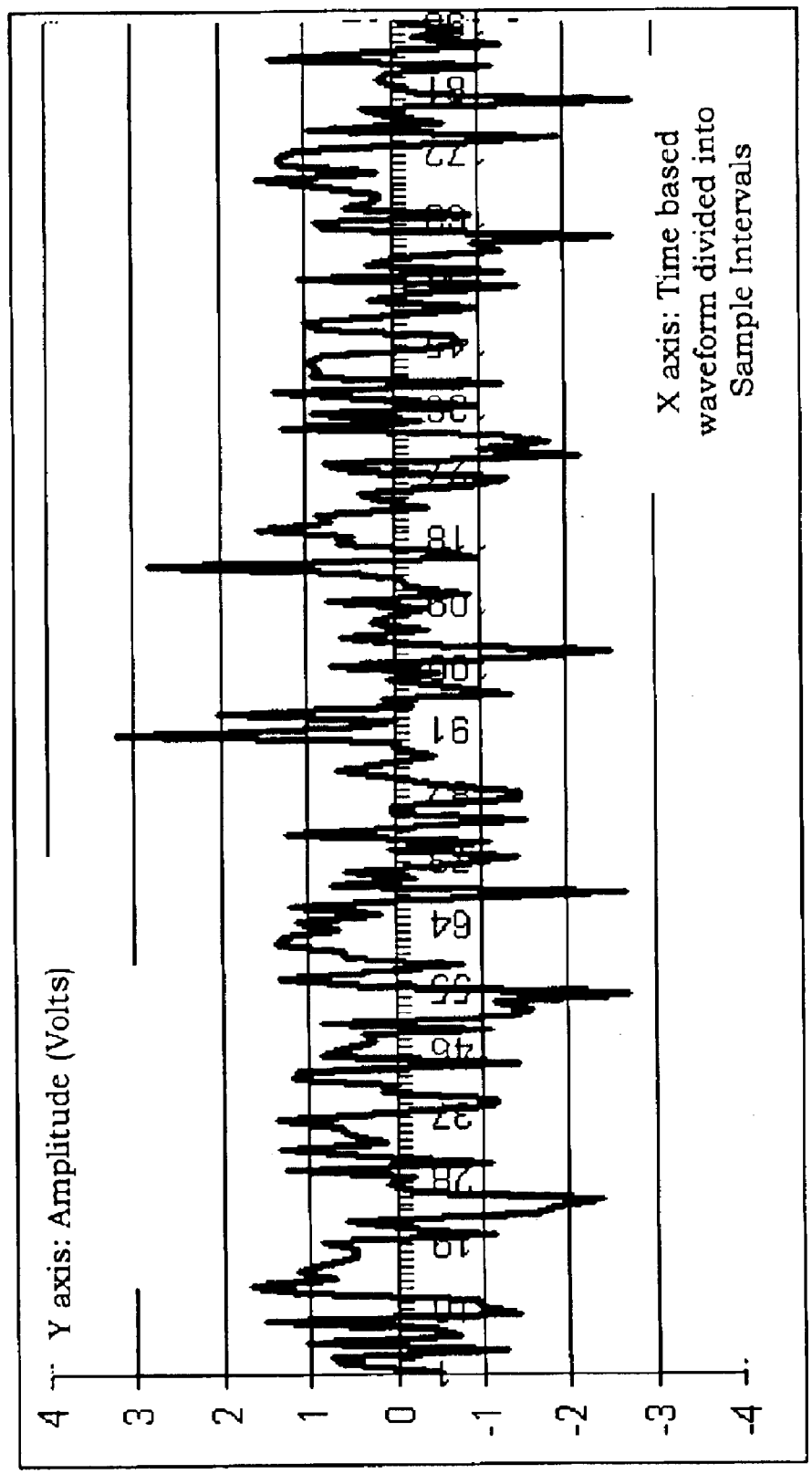
FIG. 7 is a graphical representation of an example of a vibration signal sensed by a sensor.

Referring now to FIG. 7, a graphical representation of a portion of a time based complex vibration signal indicative of seismic readings from the seismic transducer 20 monitoring the machine M is illustrated and will be employed for further delineating how the system 10 accurately determines both vibration frequencies and machine speed from a single transducer measurement for monitoring, for example, machines having rolling element bearings by determining a frequency of one of a plurality of minor frequency components in a time based complex signal and transforming the determined frequency into machine speed.

More specifically, FIG. 7 shows a summation of a 3600 CPM electric drive vibration component, a 1X component (which is the signal that is trying to be identify) and a series of spiky signals with strong 1X, 3X and 5X harmonics that generate "spiky" signals that are characteristic of seismic sensors mounted on a casing of a machine having roller element bearings. Also added in is a broadband noise component that has a peak to peak amplitude of 10% of the amplitude of the signal after all the components are summed in.

Figure 8:
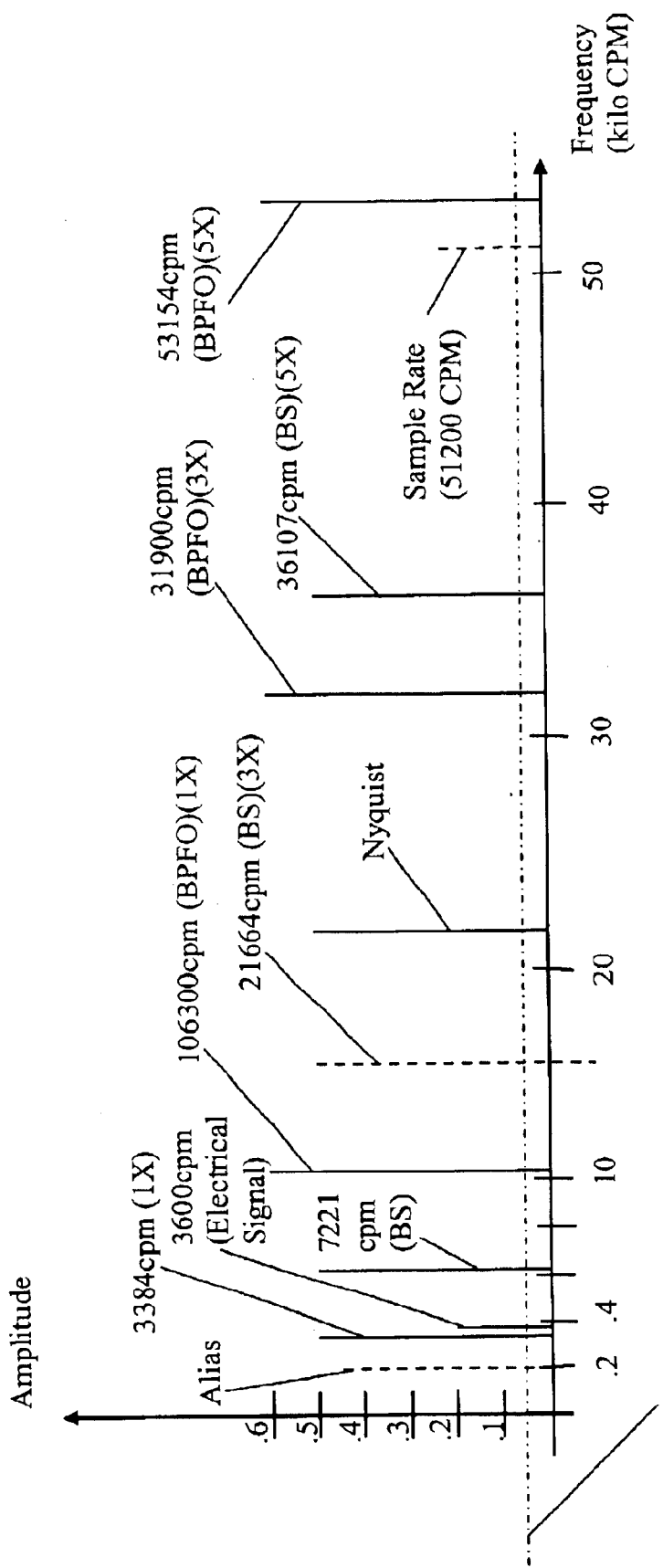
FIG. 8 is a graphical representation of an example of a spectrum plot for the signal shown in FIG. 7.

FIG. 8 shows a spectrum for the signal shown in FIG. 7. This figure shows that the unknown 1X vibration component that is being sought after is at 3384CPM (of course this is not known prior to implementing the apparatus and method in accordance with the one embodiment of the invention).

In finding the 1X vibration component there is an assumption that the frequency range of the 1X vibration component will be 93% to 99% of the 3600 CPM. Thus, in accordance with one aspect of the invention the down converter center frequency is set at 96% of 3600 or 3456 CPM. This is used to generate pairs of Inphase (cos) and quadrature (-sin) readings or components as delineated hereinabove. The data set for this example can be divided into, for example, 2048 samples and is preferably filtered by some power of 2 to get maximum use of the data set. In this example, 128 samples where chosen per inphase and quadrature average and, also chosen, was a 51200 CPM sampling rate. Thus, the filtering time or filtering interval is 0.15 seconds. This means the phase range available is 180° per 0.15 seconds. One complete rotation in 0.3 seconds implies a range of ±3.33 hertz or ±200 CPM based on a center frequency or carrier frequency of 3456CPM making the final range 3256 to 3656 CPM which covers the required range. In practice, the center frequency could be shifted down in frequency.

Figure 9:
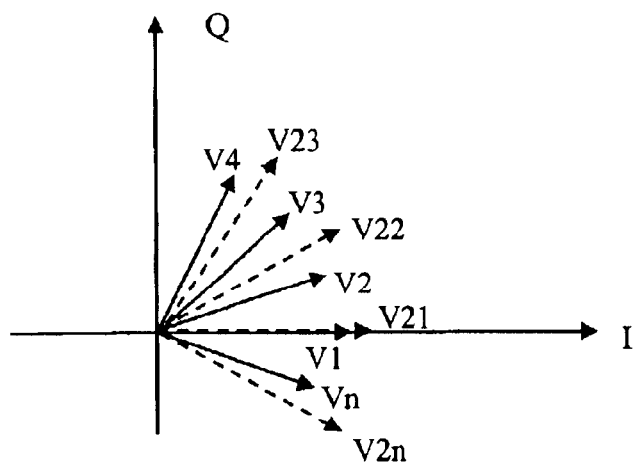
FIG. 9 is a graphical representation of an inphase and quadrature plot or polar plot of vectors obtained from filtering or averaging results obtained from mixing a down converter signal (signal of known frequency) with separate input signal (e.g., a plurality of sampled complex machine vibration signal).

As a result of the above numerical figures, and using the time based complex vibration signal a portion of which is shown in FIG. 7, there are 16 available averaged phase/sample readings which when averaged together result in one single phase change reading of −65.1424. The phase change reading divided by the filtering interval of 0.15 seconds results in a negative 434.28266 degrees per second value. In turn, the degrees per second value divided by a 360 degrees/cycle value results in a −1.20634 rotations per second (beat frequency) value corresponding to a −72.38044 rotations or cycles per minute (CPM) value. Finally, machine speed is obtained by adding the carrier frequency of 3456CPM to the beat frequency of negative 72.5124CPM for obtaining the machine speed of 3,384 CPM as shown in FIG. 8. It should be noted that the method in accordance with one aspect of the invention works extremely accurately until the signal is too small relative to the inband noise in which case it just goes off like static. This is verifiable because the phase per degree readings will be wildly varying. If this happens, another spectrum can be taken to increase the filtering. For example, and referring to FIG. 9, an additional sample set of 2048 points can be taken and run though the above method including obtaining a second set of averaged inphase and quadrature readings defining a second set first phasor $V_{21}$, a second set second phasor $V_{22}$, and so on through a second set Nth phasor $V_{2n}$ for obtaining a value which can be averaged with the value obtained from the first set of averaged inphase and quadrature readings $V_1, V_2, \ldots V_n$. Thus, a plurality of averaged phase differences obtained from a plurality of sample waveforms can be obtained and averaged together. Alternatively, a median average can be obtained from the plurality of averaged or median phase differences obtained from the plurality of sample waveforms. Remember that the output is a relative phase measurement which will not change even though the next sample set is taken at some close but uncorrelated time later.

Thus, in one aspect of the invention, the complex vibration signal is sampled at a known sample rate for defining a sampled complex vibration signal. A down convert frequency is determined and mixed with the sampled complex vibration signal to mix the signal down based on an expected range that the signal being sought after or looked for should exist in. In mixing the sampled complex vibration signal with the down converter frequency a series of inphase and quadrature readings or components are obtained (I/Q outputs). The inphase and quadrature results (I/Q outputs) are then low pass filtered. Next, consecutive readings are subtracted from which at least one phase/sec reading is obtained which is linearly proportional to the difference between the complex vibration signal and the frequency of the carrier having the down convert frequency. From this result, the signal frequency is calculated as is delineated herein. Thus, in one embodiment of the present invention, an apparatus and method for determining running speed of the machine M (i.e., machine or rotative speed) from a complex vibration signal outputted by the transducer 20 monitoring the machine comprises: 1) a sampling/digitizing means 30 such as the analog to digital converter operatively coupled to the transducer 20 for sampling and digitizing the complex vibration signal into a digitized vibration signal; 2) a mixing means 40 such as the digital down converter 70 operatively coupled to the sampling means for digitally mixing said digitized vibration signal with a digitized signal having a predetermined frequency 46 for transforming the mixed signals into a stream or series of inphase and quadrature readings or components; 3) the filter means 50 for filtering intervals of the stream or series of inphase and quadrature readings or components for defining a plurality of vectors each having a phase; 4) the processor 60 providing a subtraction means for subtracting consecutive vectors or phases for determining at least one phase per second (phase/sec) value; 5) the processor 60 providing means for determining a signal frequency of a vibration component contained in the complex vibration signal as a function of at least the one phase per second value, and 6) the processor 60 providing means for calculating the running speed of the machine (1X running speed) as a function of the determined signal frequency for use in correlating the machine vibrations to physical phenomena that generated them.

Figure 10:
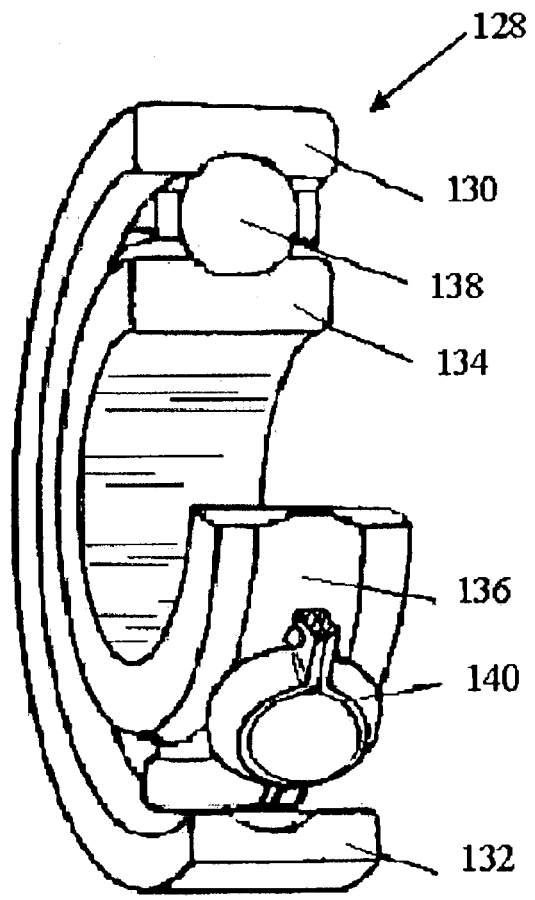
FIG. 10 is a cross sectional view of a typical roller element bearing.

In use and operation, and referring to the drawings, the system 10 can be embodied in a machinery monitor or monitoring system 120 such as a 3300 or 3500 monitor or monitoring system manufactured and sold by Bently Nevada, LLC located in Minden, Nev. U.S.A. The system 10 and monitor 120 can be operatively coupled to at least one transducer 20 which, in turn, is operatively coupled to a machine M having at least one rolling element bearing 128 comprised of an outer ring 130 having an outer race 132, and inner ring 134 having an inner race 136, and a plurality of rolling elements 138 supported by a cage 140 interposed between the outer and inner rings such that the rolling elements are rotatable about the inner and outer races (please see FIG. 10). Additionally, the system 10 and/or monitor 120 can be operatively coupled to the computer 110 and/or to the digital to analog converter 80 which in turn, can be operatively coupled to physical output devices 90 such as alarms, relay outputs, or current outputs wherein the processing means 60 can process bearing-related vibration frequencies as a function of machine speeds determined in accordance with one aspect of the invention for monitoring rolling element bearing-related vibration problems and then conveying this information to output devices 90 or computer 110 for, inter alia, generating alarms based on determined bearing-related vibration problems and using these alarms to automatically shut down the machine M and/or for automatically annunciating machinery problems to operators and other plant personnel. Thus, in one aspect, the present invention provides an apparatus and method for determining machine speed from complex vibration signals engendered from a single seismic transducer monitoring a machine having a rolling element bearing 128 and for providing the means for knowing where to specifically look for bearing-related vibration frequencies indicative of bearing-related vibration problems. Thus, an embodiment of the present invention provides an apparatus and method for determining both vibration frequencies and machine speed from a single seismic transducer or bearing housing, casing or structural vibration measurement for monitoring, for example, rolling element bearings.

Moreover, having thus described the present invention, it should be apparent that numerous modifications and adaptations may be resorted to without departing from the scope and fair meaning of the present invention as set forth hereinabove and as described hereinbelow by the claims.

I claim:

1. A method for determining running speed of a machine from a complex vibration signal outputted by a transducer monitoring machine vibration, the steps including:

sampling and digitizing a complex vibration signal into a digitized vibration signal;

digitally mixing the digitized vibration signal with a digitized signal having a predetermined frequency for obtaining a mixed signal comprised of a stream of inphase and quadrature components;

transforming the stream of inphase and quadrature components into at least one phase per second value;

determining a signal frequency of a vibration component contained in the complex vibration signal as a function of at least the one phase per second value, and calculating machine running speed as a function of the determined signal frequency for use in correlating machine vibrations to physical phenomena that generated them.

2. The method of claim 1 wherein the sampling step includes sampling and digitizing at a known sampling rate.

3. The method of claim 1 wherein the mixing step includes mixing by employing a digital down converter for mixing the digitized vibration signal with the digitized signal having the predetermined frequency defined by a programmable down converter center frequency for obtaining the series of inphase and quadrature components.

4. The method of claim 1 wherein the transforming step includes the steps of: a) filtering the series of inphase and quadrature components at predefined time intervals each interval having the same duration in time to obtain a plurality of values or vectors having associated phases; b) sequencing through the plurality of values, vectors or phases and taking a difference between each subsequent value, vector or phase and its immediately previous value, vector or phase starting after a first defined value, vector or phase for defining value, vector, or phase differences which define delta phase values; and c) determining at least the one phase per second value as a function of the delta phase values by dividing at least one selected delta phase value; an average of the delta phase values; or a median of the delta phase values by the predefined time interval for determining at least the one phase per second value.

5. The method of claim 1 wherein the determining step includes the steps of: calculating the signal frequency of the vibration component contained in the complex vibration signal as a function of at least the one phase per second value by determining a frequency of the resultant mixed signal for defining a beat frequency wherein the beat frequency is equal to at least the one phase per second value divided by three hundred sixty degrees per cycle and then determining the running speed vibration component frequency by adding the predetermined frequency to the beat frequency.

6. The method of claim 1 wherein the calculating step includes the step of calculating the machine running speed in cycles per minute by multiplying the running speed vibration component frequency in cycles per second by sixty seconds per minute.

7. A method for determining running speed of a machine from a signal outputted by a transducer monitoring the machine, the steps including:

sampling and digitizing the signal into a first digitized signal;

digitally mixing the digitized signal with a second digitized signal having a predetermined frequency for obtaining a mixed signal comprised of a stream of inphase and quadrature components;

transforming the stream of inphase and quadrature components into at least one phase value;

determining a signal frequency of an unknown component contained in the first digitized signal as a function of at least the one phase per second value, and calculating machine running speed as a function of the determined signal frequency of the unknown component for use in correlating the machine measurements to physical phenomena that generated them.

8. The method of claim 7 wherein the transforming step includes the step of filtering the series of inphase and quadrature components at predefined time intervals each interval having the same duration in time to obtain a plurality of phase values.

9. The method of claim 8 wherein the transforming step further includes the step of sequencing through the plurality of phase values and taking a difference between each subsequent phase value and its immediately previous phase value starting after a first defined phase value for defining delta phase values.

10. The method of claim 9 wherein the transforming step further includes the step of determining at least the one phase per second value as a function of delta phase values by dividing at least one selected delta phase value; an average of the delta phase values; or a median of the delta phase values by the predefined time interval for determining at least the one phase per second value.

11. The method of claim 10 wherein the calculating step includes the steps of: calculating the signal frequency of the unknown component contained in the signal as a function of at least the one phase per second value by determining a frequency of the resultant mixed signal for defining a beat frequency wherein the beat frequency is equal to at least the one phase per second value divided by three hundred sixty degrees per cycle and then determining the running speed vibration component frequency by adding the predetermined frequency to the beat frequency.

12. The method of claim 11 wherein the calculating step further includes the step of calculating the machine running speed in cycles per minute by multiplying the determined running speed vibration component frequency in cycles per second by sixty seconds per minute.

13. The method of claim 7 wherein the mixing step includes mixing by employing a digital down converter for mixing the first digitized signal with the second digitized signal having the predetermined frequency defined by a programmable down converter center frequency for obtaining the series of inphase and quadrature components.

14. A method for determining running speed of a machine from a signal outputted by a transducer monitoring the machine, the steps including:
   sampling and digitizing the vibration signal into a first digitized signal;
   digitally mixing the first digitized signal with a second digitized signal having a predetermined frequency for obtaining a stream of inphase and quadrature components;
   transforming the stream of inphase and quadrature components into at least one rotating vector;
   determining the angular velocity of at least the one rotating vector, and
   determining machine running speed as a function of the determined angular velocity of at least the one rotating vector for use in correlating machine measurements to physical phenomena that generated them.

15. An apparatus for determining running speed of a machine from a complex vibration signal outputted by a transducer monitoring the machine, said apparatus comprising in combination:
   an analog to digital converter operatively coupled to the transducer for sampling and digitizing said complex vibration signal into a digitized vibration signal;
   a digital multiplier operatively coupled to said analog to digital converter for digitally mixing said digitized vibration signal with a digitized signal having a predetermined frequency for obtaining a mixed signal comprised of a stream of inphase and quadrature components;
   a filtering means operatively coupled to said digital multiplier for filtering intervals of said stream of inphase and quadrature components for obtaining a plurality of vectors each having a phase;
   a processor operatively coupled to said filtering means for transforming said plurality of vectors into at least one phase per second value;
   said processor determining a signal frequency of a vibration component contained in said complex vibration signal as a function of at least said one phase per second value, and
   said processor calculating a machine running speed as a function of said determined signal frequency for use in correlating the machine vibrations to physical phenomena that generated them.

16. The apparatus of claim 15 including a digital down converter operatively coupled to said analog to digital converter for digitally mixing said digitized vibration signal with said digitized signal having said predetermined frequency defined by a programmable down converter center frequency for obtaining said series of inphase and quadrature components.

17. The apparatus of claim 16 wherein said processor transforms said plurality of vectors into at least said one phase per second value by providing means for sequencing through said plurality of vectors and taking a difference between each subsequent vector and its immediately previous vector starting after a first defined vector for defining vector differences which define delta phase values and by providing means for determining at least said one phase per second value as a function of delta phase values by dividing at least one selected delta phase value; an average of said delta phase values; or a median of said delta phase values by said predefined time interval for determining at least said one phase or degrees per second value.

18. The apparatus of claim 17 wherein said processor provides means for calculating said signal frequency of said vibration component contained in said complex vibration signal as a function of at least said one phase per second value by determining a frequency of said mixed signal for defining a beat frequency wherein the beat frequency is equal to at least the one phase per second value divided by three hundred sixty degrees cycle.

19. The apparatus of claim 18 wherein said processor provides means for determining said running speed vibration component frequency by adding said predetermined frequency to said beat frequency.

20. The apparatus of claim 19 said processor provides means for calculating said machine running speed in cycles per minute by multiplying said determined running speed vibration component frequency in cycles per second by sixty seconds per minute.

* * * * *